US008423805B2

(12) United States Patent
Li et al.

(10) Patent No.: US 8,423,805 B2
(45) Date of Patent: Apr. 16, 2013

(54) POWER SUPPLY DEVICE, PORTABLE ELECTRONIC APPARATUS AND RELATED METHOD FOR DETERMINING TYPES OF A POWER SUPPLY DEVICE

(75) Inventors: Chih-Hung Li, Taoyuan County (TW); Yung-Hsien Kuo, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/495,005

(22) Filed: Jun. 13, 2012

(65) Prior Publication Data

US 2012/0260110 A1  Oct. 11, 2012

Related U.S. Application Data

(62) Division of application No. 12/612,657, filed on Nov. 4, 2009, now Pat. No. 8,225,114.

(30) Foreign Application Priority Data

Jul. 22, 2009 (TW) ................................ 98124718 A

(51) Int. Cl.
   | | |
   |---|---|
   | G06F 1/00 | (2006.01) |
   | H02J 7/00 | (2006.01) |
   | G05F 1/00 | (2006.01) |
   | B23K 11/24 | (2006.01) |
   | H02M 7/5383 | (2007.01) |
   | H02M 1/10 | (2006.01) |

(52) U.S. Cl.
   USPC ........... 713/300; 320/107; 320/137; 323/293; 323/318; 363/74; 363/142; 439/488; 710/105; 710/305

(58) Field of Classification Search .................. 713/300; 320/107, 137; 323/293, 318; 363/74, 142; 439/488; 710/105, 305
See application file for complete search history.

(56) References Cited

U.S. PATENT DOCUMENTS

| | | | |
|---|---|---|---|
| 7,271,568 B2 | 9/2007 | Purdy | |
| 7,581,970 B2 * | 9/2009 | Englund | ....................... 439/171 |

(Continued)

FOREIGN PATENT DOCUMENTS

| | | |
|---|---|---|
| CN | 1574539 A | 2/2005 |
| CN | 1892521 A | 1/2007 |

(Continued)

OTHER PUBLICATIONS

Search report issued on Jun. 7, 2011 for EP application No. 09014844.6, filing date Nov. 30, 2009, pp. 1-3.

(Continued)

*Primary Examiner* — Stefan Stoynov
(74) *Attorney, Agent, or Firm* — Winston Hsu; Scott Margo

(57) ABSTRACT

A portable electronic apparatus is connected to a power supply device via a transmission line, and it includes a designated connector, a charge control circuit, and a judgment circuit. The designated connector includes five terminals respectively corresponding to five pins of a USB connector of the power supply device. When the power supply device is connected to the portable electronic apparatus, the first terminal of the designated connector is logic high, the fourth terminal of the designated connector is logic high, and the third terminal of the designated connector is logic high after pulling up the voltage level of the second terminal, the judgment circuit pulls down the voltage level of the third terminal and detects the voltage level of the third terminal so as to generate a determining result for determining a type of the power supply device.

1 Claim, 6 Drawing Sheets

U.S. PATENT DOCUMENTS

| | | | |
|---|---|---|---|
| 7,701,168 B2 | 4/2010 | Thijssen | |
| 8,065,446 B2 | 11/2011 | Kang | |
| 8,237,414 B1 * | 8/2012 | Li et al. ................ | 320/160 |
| 2006/0015757 A1 | 1/2006 | Tupman | |
| 2008/0272741 A1 | 11/2008 | Kanamori | |
| 2008/0303486 A1 | 12/2008 | Kao | |
| 2010/0070659 A1 | 3/2010 | Ma | |
| 2010/0201308 A1 | 8/2010 | Lindholm | |

FOREIGN PATENT DOCUMENTS

| | | |
|---|---|---|
| EP | 1482619 A2 | 12/2004 |
| EP | 1742140 A2 | 1/2007 |
| EP | 2 043 223 A2 | 4/2009 |
| GB | 2 401 259 A | 11/2004 |
| TW | I263902 | 10/2006 |
| TW | 200744302 | 12/2007 |
| TW | 200924301 | 6/2009 |
| WO | 2008001153 A1 | 1/2008 |
| WO | 2009063278 A1 | 5/2009 |

OTHER PUBLICATIONS

Office action mailed on Aug. 1, 2012 for the China application No. 200910160235.6, filing date Jul. 30, 2009, p. 1-9.

Office action mailed on Oct. 22, 2012 for the Taiwan application No. 098124718, filed Jul. 22, 2009, p. 1-4.

Office action mailed on Jan. 15, 2013 for the Taiwan application No. 098124718, filing date Jul. 22, 2009, p. 1-4.

* cited by examiner

US 8,423,805 B2

POWER SUPPLY DEVICE, PORTABLE ELECTRONIC APPARATUS AND RELATED METHOD FOR DETERMINING TYPES OF A POWER SUPPLY DEVICE

CROSS REFERENCE TO RELATED APPLICATIONS

This division application claims the benefit of U.S. application Ser. No. 12/612,657, which was filed on Nov. 4, 2009 and entitled "POWER SUPPLY DEVICE, PORTABLE ELECTRONIC APPARATUS AND RELATED METHOD FOR DETERMINING TYPES OF A POWER SUPPLY DEVICE".

BACKGROUND OF THE INVENTION

1. Field of the Invention

The present invention relates to a judgment mechanism of power supply devices, and more particularly, to a power supply device, a portable electronic apparatus and a related method for determining types of a power supply device.

2. Description of the Prior Art

In today's market, mobile phones have their own mobile chargers in accordance with their brands or models. For example, a mobile charger labeled as "H Brand" can provide the use for a mobile phone labeled as the "H Brand" only, and is unable to perform charging upon mobile phones labeled as "N Brand" or "M Brand". However, China's Ministry of Information Industry (CMII) promotes that the connector interface of the mobile chargers must conform to universal serial bus (USB) specification; that is to say, the same mobile charger can be used to perform charging upon the mobile phones with different brands or different models.

Generally speaking, USB transmission interface has five transmission terminals that respectively are: a VBUS terminal, a D+ terminal, a D-terminal, an ID terminal, and a GND terminal. As far as a charger conforming to China Charger's specifications is concerned, the D+ terminal and the D-terminal are short circuited inside the body of the charger, and therefore this feature can be used as a recognition feature of the China Charger's specifications.

When the USB connector of the mobile phone is connected to a USB connector of an electronic device, the mobile phone must have the ability to accurately determine the type of the electronic device, such that the mobile phone can operate correctly. As an illustration, when the electronic device is a charger, the mobile phone can charge itself by making use of this charger. As another illustration, when the electronic device is not a charger and is a computer host, the mobile phone is able to transmit data between the computer host. Moreover, even though the abovementioned concept of adopting the same mobile charger to perform charging upon the mobile phones with different brands or different models is convenient, there are too many types of mobile chargers existent in today's market and it is impossible to control their qualities. If a mobile phone that allows chargers with any brand to perform charging upon it without any restrictions, the mobile phone may be continuously charged, which leads to voltage levels of its internal capacitors exceed the nominal values so as to burn out the capacitors. What is more, it may cause damage to other components or can not meet safety standards, which is dangerous. Hence, a portable electronic apparatus capable of determining the type of the connected electronic device and a related judgment mechanism are required.

SUMMARY OF THE INVENTION

It is one of the objectives of the claimed invention to provide a power supply device, a portable electronic apparatus and a related method for determining types of a power supply device to solve the abovementioned problems.

According to one embodiment, a power supply device is provided. The power supply device includes a power input terminal, a power converting circuit, and a USB connector. The power input terminal is used for receiving an input power. The power converting circuit is coupled to the power input terminal for converting the input power into a charge power. The USB connector includes: a first pin for providing the charge power, a second pin for delivering data, a third pin for delivering data, a fourth pin used as an identification judgment, a fifth pin coupled to a grounding terminal, and a resistor element. The resistor element is coupled between the second pin and the third pin, and has a resistance greater than or equal to 150K Ω.

According to another embodiment, a portable electronic apparatus is provided. The portable electronic apparatus is connected to a power supply device via a transmission line. Herein the power supply device includes a USB connector, and the USB connector has a first pin used for providing a charge power, a second pin used for delivering data, a third pin used for delivering data, a fourth pin used as an identification judgment, and a fifth pin coupled to a grounding terminal. The portable electronic apparatus includes a designated connector, a charge control circuit, and a judgment circuit. The designated connector includes: a first terminal corresponding to the first pin of the USB connector, a second terminal corresponding to the second pin of the USB connector, a third terminal corresponding to the third pin of the USB connector, a fourth terminal corresponding to the fourth pin of the USB connector, and a fifth terminal corresponding to the fifth pin of the USB connector. The charge control circuit is coupled to the designated connector for receiving the charge power from the first pin of the USB connector via the first terminal of the designated connector. The judgment circuit is coupled to the designated connector and the charge control circuit. The judgment circuit includes a first determining unit. When the power supply device is connected to the portable electronic apparatus, a voltage level of the first terminal is logic high, a voltage level of the fourth terminal is logic high, and a voltage level of the third terminal is logic high after pulling up a voltage level of the second terminal, the first determining unit is used for pulling down the voltage level of the third terminal and detecting the voltage level of the third terminal so as to generate a third determining result. Herein the judgment circuit determines a type of the power supply device according to at least the third determining result.

According to another embodiment, a method for determining a type of a power supply device is provided, wherein the power supply device is connected to a portable electronic apparatus via a transmission line. The power supply device includes a USB connector, wherein the USB connector has a first pin used for providing a charge power, a second pin used for delivering data, a third pin used for delivering data, a fourth pin used as an identification judgment, and a fifth pin coupled to a grounding terminal. The portable electronic apparatus includes a designated connector, and the designated connector has a first terminal corresponding to the first pin of the USB connector, a second terminal corresponding to the second pin of the USB connector, a third terminal corresponding to the third pin of the USB connector, a fourth terminal corresponding to the fourth pin of the USB connector, and a fifth terminal corresponding to the fifth pin of the USB connector. The method includes the steps of: when the power supply device is connected to the portable electronic apparatus, a voltage level of the first terminal is logic high, a voltage level of the fourth terminal is logic high, and a voltage level of the third terminal is logic high after pulling up a voltage level of the second terminal, pulling down the voltage level of the third terminal; when the voltage level of the third terminal is pulled down, detecting the voltage level of the third terminal so as to generate a third determining result; and determining the type of the power supply device according to at least the third determining result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
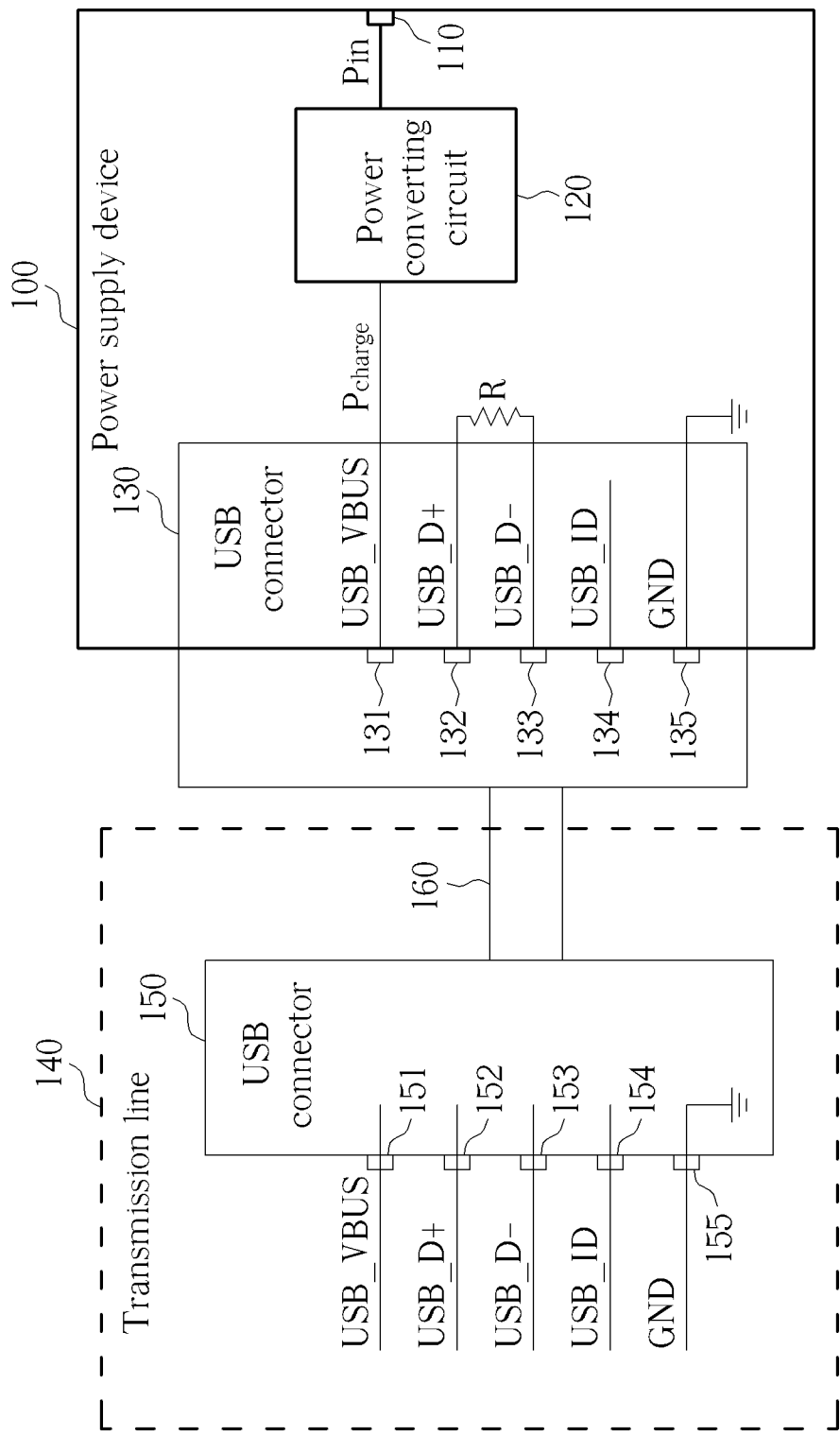
FIG. 1 is a diagram showing a power supply device according to an embodiment of the present invention.

Please refer to FIG. 1. FIG. 1 is a diagram showing a power supply device 100 according to an embodiment of the present invention. As shown in FIG. 1, the power supply device 100 includes, but is not limited to, a power input terminal 110, a power converting circuit 120, and a universal serial bus (USB) connector 130. Herein the power input terminal 110 receives an input power Pin. The power converting circuit 120 is coupled to the power input terminal 110 for converting the input power Pin into a charge power $P_{charge}$. The USB connector 130 includes five pins 131~135 and a resistor element R, wherein the first pin 131 is used for providing the charge power $P_{charge}$, the second pin 132 and the third pin 133 are used for delivering data, the fourth pin 134 is used as an identification judgment, and the fifth pin 135 is coupled to a grounding terminal. In other words, the first pin 131 is used for delivering a VBUS signal, the second pin 132 is used for delivering a D+ signal, the third terminal 133 is used for delivering a D− signal, the fourth terminal 134 is used for delivering an ID signal, and the fifth pin 135 is used for delivering a GND signal. Operations of the USB interface are already well-known to those skilled in the art, and further description is omitted here for brevity.

Please note that the abovementioned resistor element R is coupled between the second pin 132 (i.e., the D+ pin) and the third pin 133 (i.e., the D− pin), and this resistor element R has resistance greater than or equal to 150KΩ, but this should not be considered as a limitation of the present invention. Moreover, the power supply device 100 can be a charger, and the power converting circuit 120 can be an AC to DC converter used for converting an alternating current power (e.g., 110V or 220V) into a direct current power.

In general, the power supply device 100 is connected to a portable electronic apparatus via a transmission line 140, wherein the power supply device 100 provides the charge power $P_{charge}$ to the portable electronic apparatus in order to charge the portable electronic apparatus. The transmission line 140 is implemented by a USB transmission line, which includes a USB connector 150 and a connection cable 160. From FIG. 1, we can see that the USB connector 150 of the transmission line 140 has five pins 151~155 as well, and these five pins 151~155 correspond to the five pins 131~135 of the USB connector 130 disposed in the power supply device 100 respectively. What calls for special attention is that the power supply device 100 and the transmission line 140 herein can be designed as a single set of accessory, or they can be designed as two separate accessories to stand alone. If the power supply device 100 and the transmission line 140 are designed as two separate accessories, the transmission line 140 can further be used for transmitting data and is not limited to the purpose of charging only. As a result, not only can the cost be saved, but also its applications can be expanded.

Currently there are already a variety of power supply devices existing on the market. In the following, several common power supply devices are used as examples in order to facilitate the follow-up descriptions.

Figure 2:
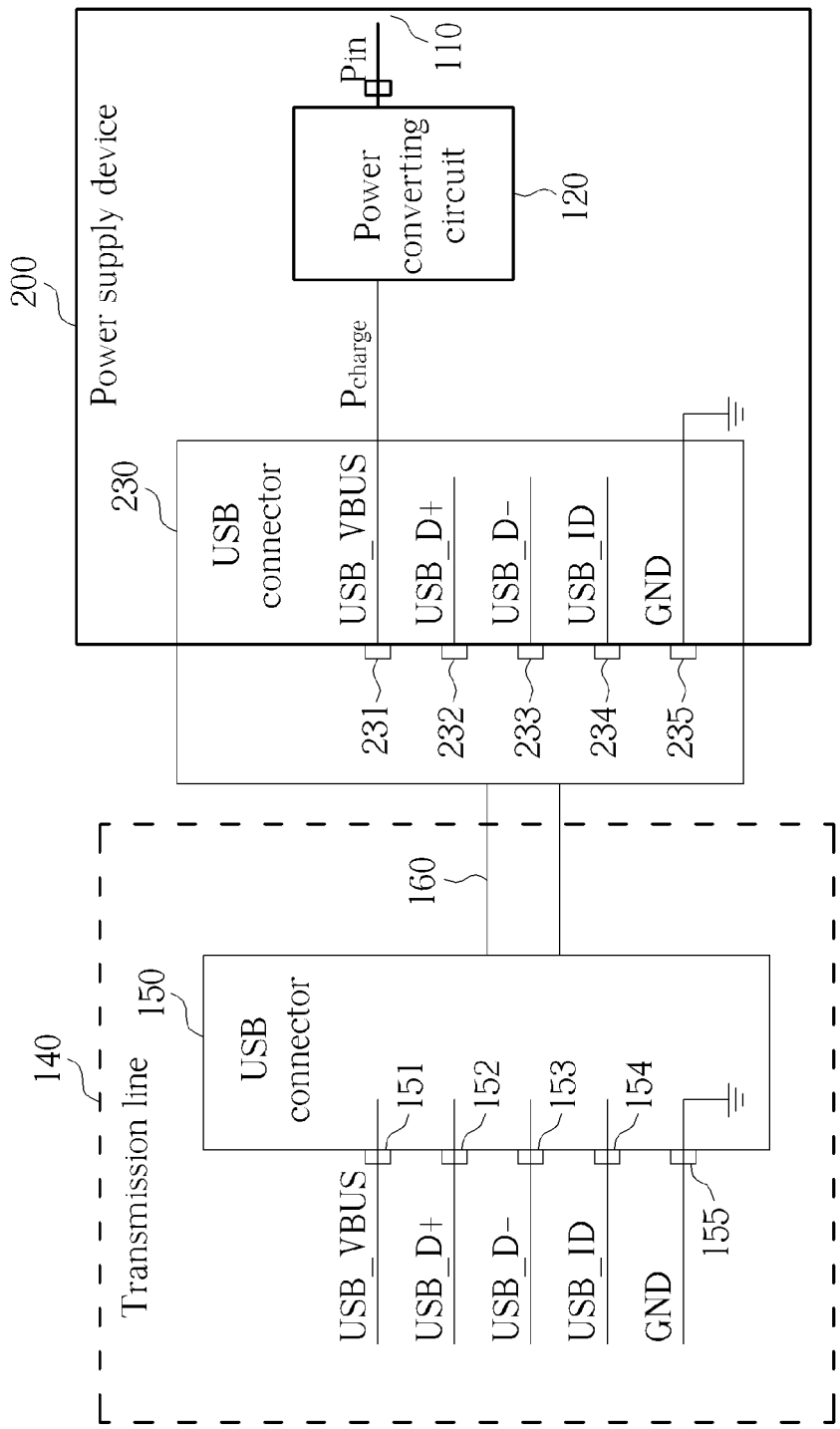
FIG. 2 is a diagram showing a traditional power supply device.

Please refer to FIG. 2. FIG. 2 is a diagram showing a traditional power supply device 200. As shown in FIG. 2, the power supply device 200 includes a power input terminal 110, a power converting circuit 120, and a USB connector 230. The USB connector 230 includes five pins 231~235. Be noted that the USB connector 230 is similar to the USB connector 130 shown in FIG. 1, and the difference between them is that there is no resistor element R (or other elements) connected between the second pin 232 and the third pin 233 of the USB connector 230. Since there is no change in the USB connector 230 of the power supply device 200, and there is no change in the USB connector 150 of the transmission line 140, this power supply device 200 could be a commercially available charger or it can be implemented by connecting to a computer host via a transmission line.

Figure 3:
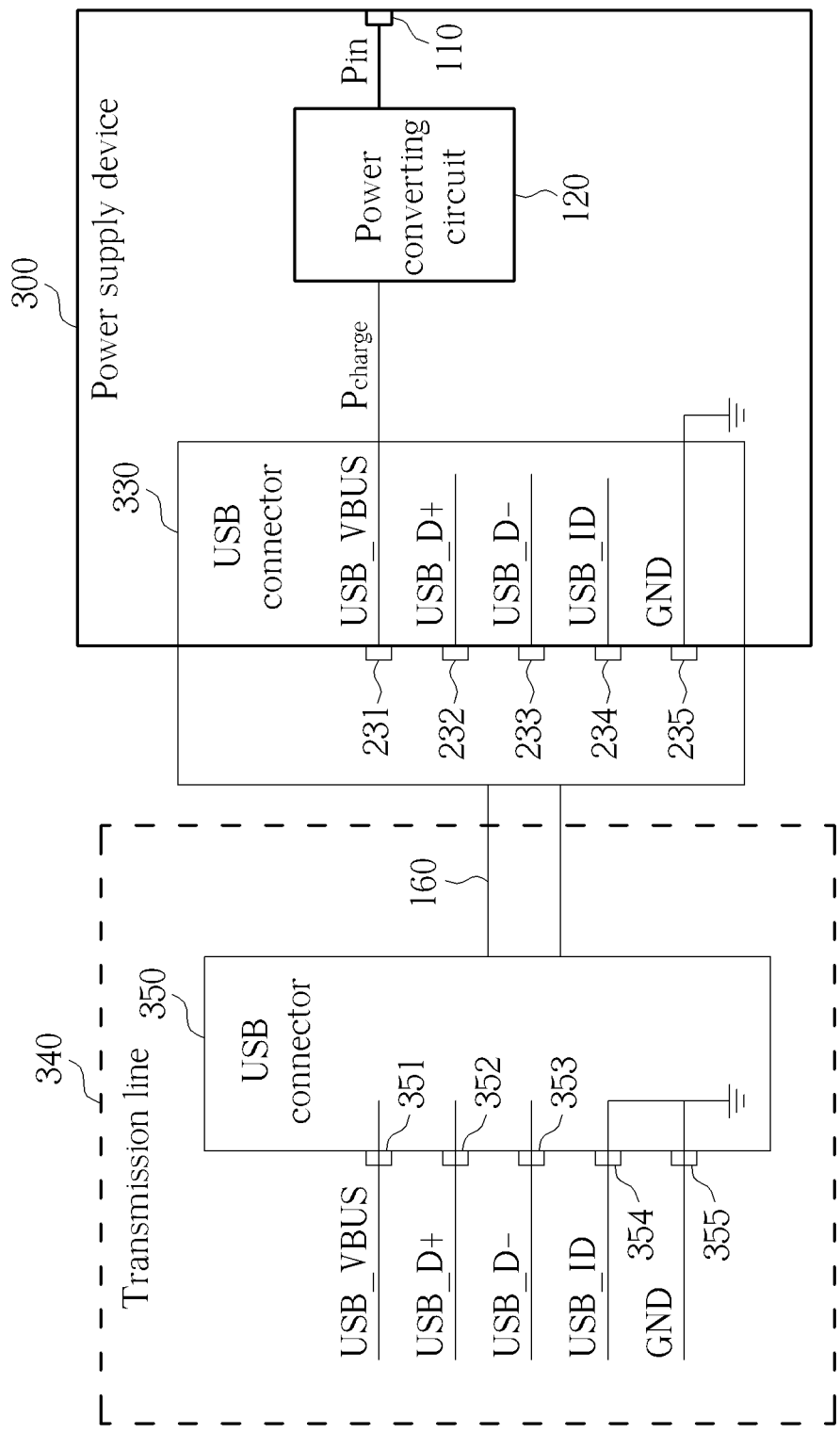
FIG. 3 is a diagram showing a traditional power supply device.

Please refer to FIG. 3. FIG. 3 is a diagram showing a traditional power supply device 300. As shown in FIG. 3, the power supply device 300 includes a power input terminal 110, a power converting circuit 120, and a USB connector 330. Herein the USB connector 330 is completely the same as the USB connector 230 shown in FIG. 2. The difference between FIG. 3 and FIG. 2 is that a USB connector 350 at the transmission line 340 side has a little change, that is, a fourth pin 354 (i.e., the ID pin) of the USB connector 350 is coupled to the grounding terminal. For this reason, when the power supply device 300 is connected to the transmission line 340, the fourth pin 354 of the USB connector 330 disposed in the power supply device 300 is pulled down to logic low. Therefore, the type of the power supply device can be distinguished by means of the characteristics.

Figure 4:
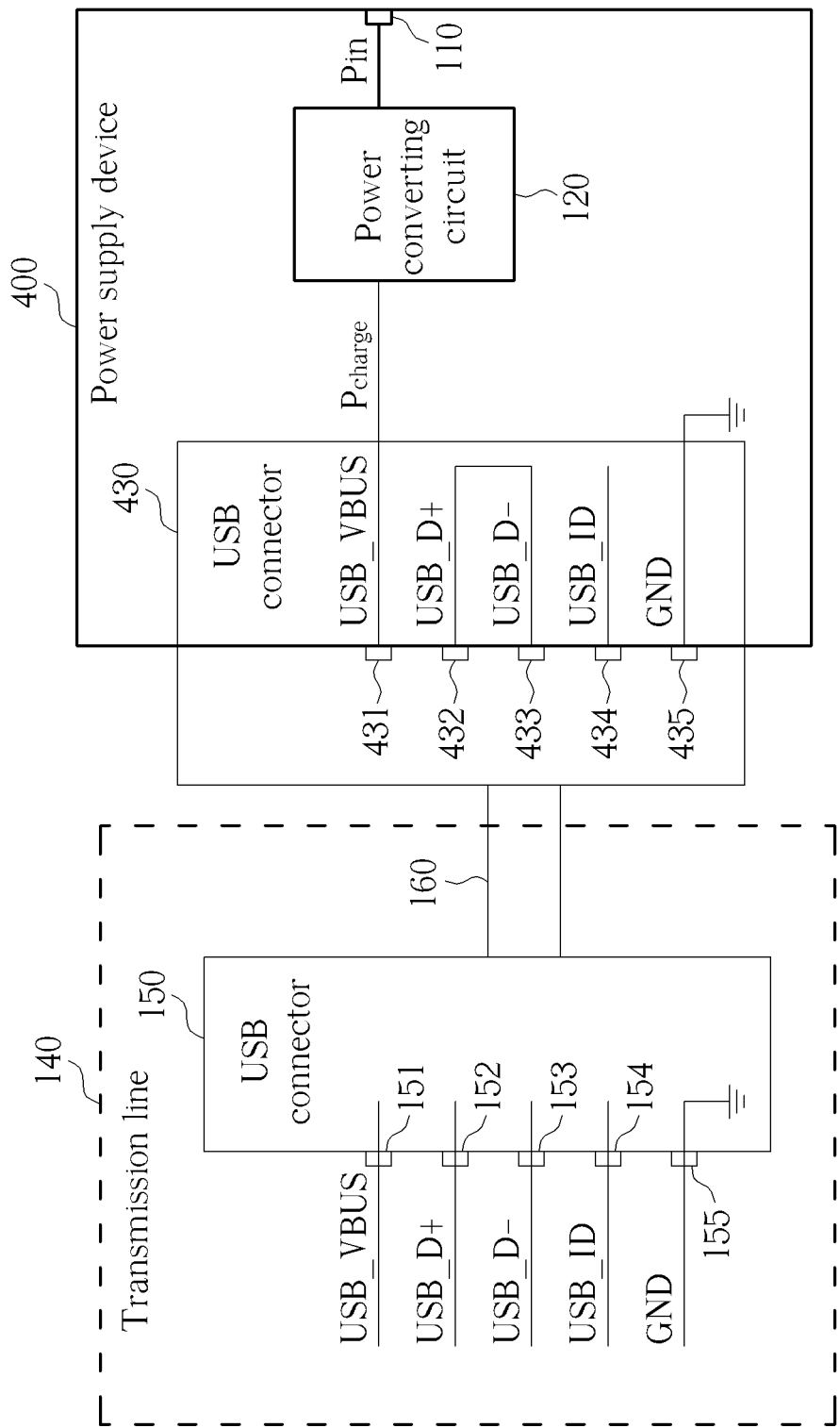
FIG. 4 is a diagram showing a traditional power supply device.

Please refer to FIG. 4. FIG. 4 is a diagram showing a traditional power supply device 400. As shown in FIG. 4, the power supply device 400 includes a power input terminal 110, a power converting circuit 120, and a USB connector 430. Herein the USB connector 430 includes five pins 431~435 as well. Be noted that the USB connector 430 is similar to the USB connector 130 shown in FIG. 1, and the difference between them is that the second pin 432 and the third pin 434 of the USB connector 430 are directly short circuited. That is to say, this power supply device 400 is a charger conforming to China Charger's specifications.

In order to distinguish the power supply devices 100~400 of different types mentioned above, a judgment mechanism for determining the types of the power supply devices and a related portable electronic apparatus (such as a mobile phone or a PDA) are disclosed in the present invention.

Figure 5:
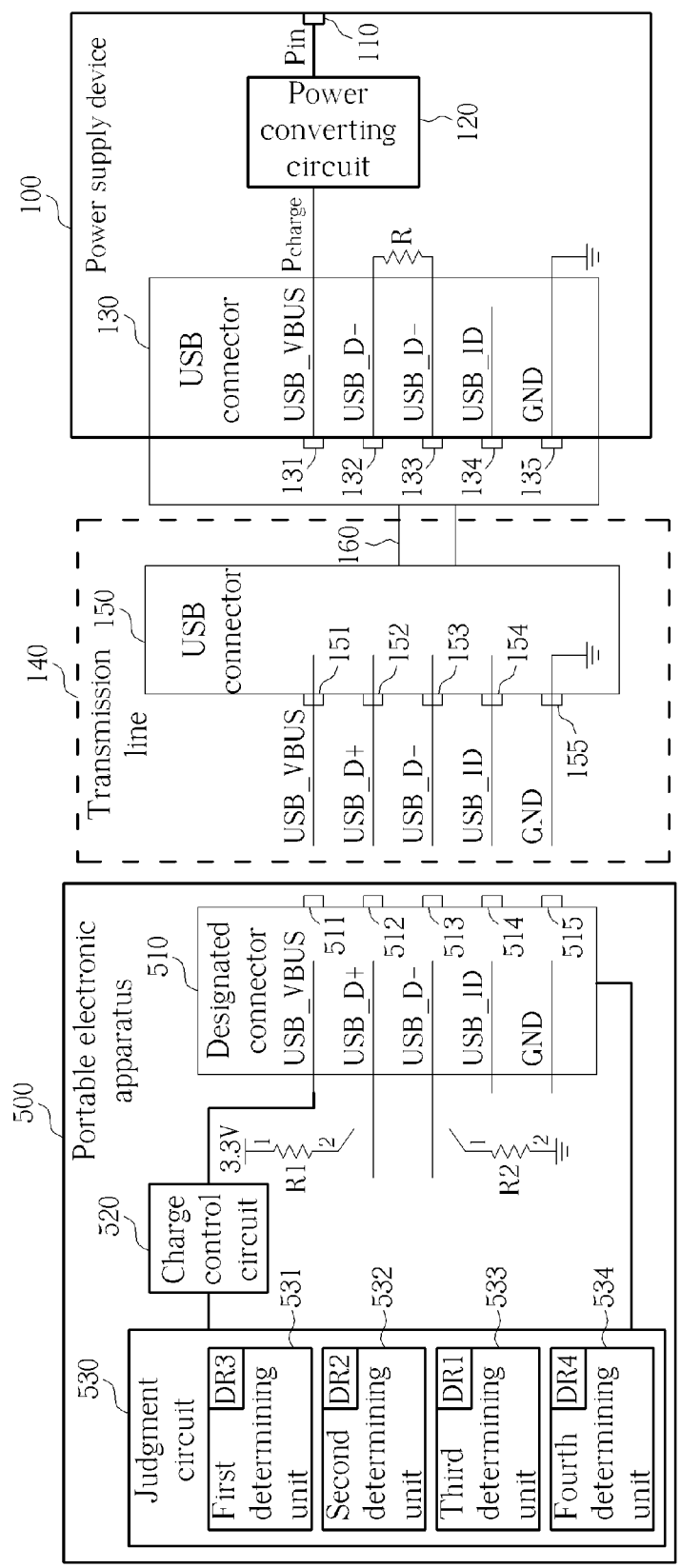
FIG. 5 is a diagram of a portable electronic apparatus according to an embodiment of the present invention.

Please refer to FIG. 5. FIG. 5 is a diagram of a portable electronic apparatus 500 according to an embodiment of the present invention. The portable electronic apparatus 500 is able to be connected to a power supply device via a transmission line. In this embodiment, a case that the portable electronic apparatus 500 is connected to the power supply device 100 via the transmission line 140 as shown in FIG. 1 is used as an example for descriptions, but this in no way should be considered as limitations of the present invention. As FIG. 5 depicts, the portable electronic apparatus 500 includes, but is not limited to, a designated connector 510, a charge control circuit 520, and a judgment circuit 530. The designated connector 510 has five terminals 511~515, wherein the first terminal 511 corresponds to the first pin 131 of the USB connector 130 in the power supply device 100, the second terminal 512 corresponds to the second pin 132 of the USB connector 130, the third terminal 513 corresponds to the third pin 133 of the USB connector 130, the fourth terminal 514 corresponds to the fourth pin 134 of the USB connector 130, and the fifth terminal 515 corresponds to the fifth pin 135 of the USB connector 130.

Please keep referring to FIG. 5. The charge control circuit 520 is coupled to the designated connector 510, and receives the charge power $P_{charge}$ from the first pin 131 of the USB connector 130 via the first terminal 511. After that, the charge control circuit 520 performs a charging action of the portable electronic apparatus 500 by making use of the charge power $P_{charge}$. The judgment circuit 530 is coupled to the designated connector 510 and the charge control circuit 520. The judgment circuit 530 includes, but is not limited to, a first determining unit 531, a second determining unit 532, a third determining unit 533, and a fourth determining unit 534. When a power supply device is connected to the portable electronic apparatus 500 and a voltage level of the first terminal 511 is logic high, the third determining unit 533 is used for detecting a voltage level of the fourth terminal 514 (i.e., the ID terminal) so as to generate a first determining result DR1; when the voltage level of the second terminal 512 (i.e., the D+ terminal) is pulled up, the second determining unit 532 is used for detecting the voltage level of the third terminal 513 (i.e., the D− terminal) so as to generate a second determining result DR2; when the voltage level of the third terminal 513 is pulled down, the first determining unit 531 is used for determining the voltage level of the third terminal 513 so as to generate a third determining result DR3; and when the second determining result DR2 of the second determining unit 532 indicates that the voltage level of the third terminal 513 is logic low, the fourth determining unit 534 is used for determining whether the portable electronic apparatus 500 is a USB-configured device so as to generate a fourth determining result DR4. Finally, the judgment circuit 530 determines the type of the power supply device that is connected to the portable electronic apparatus 500 according to the determining results DR1~DR4.

Figure 6:
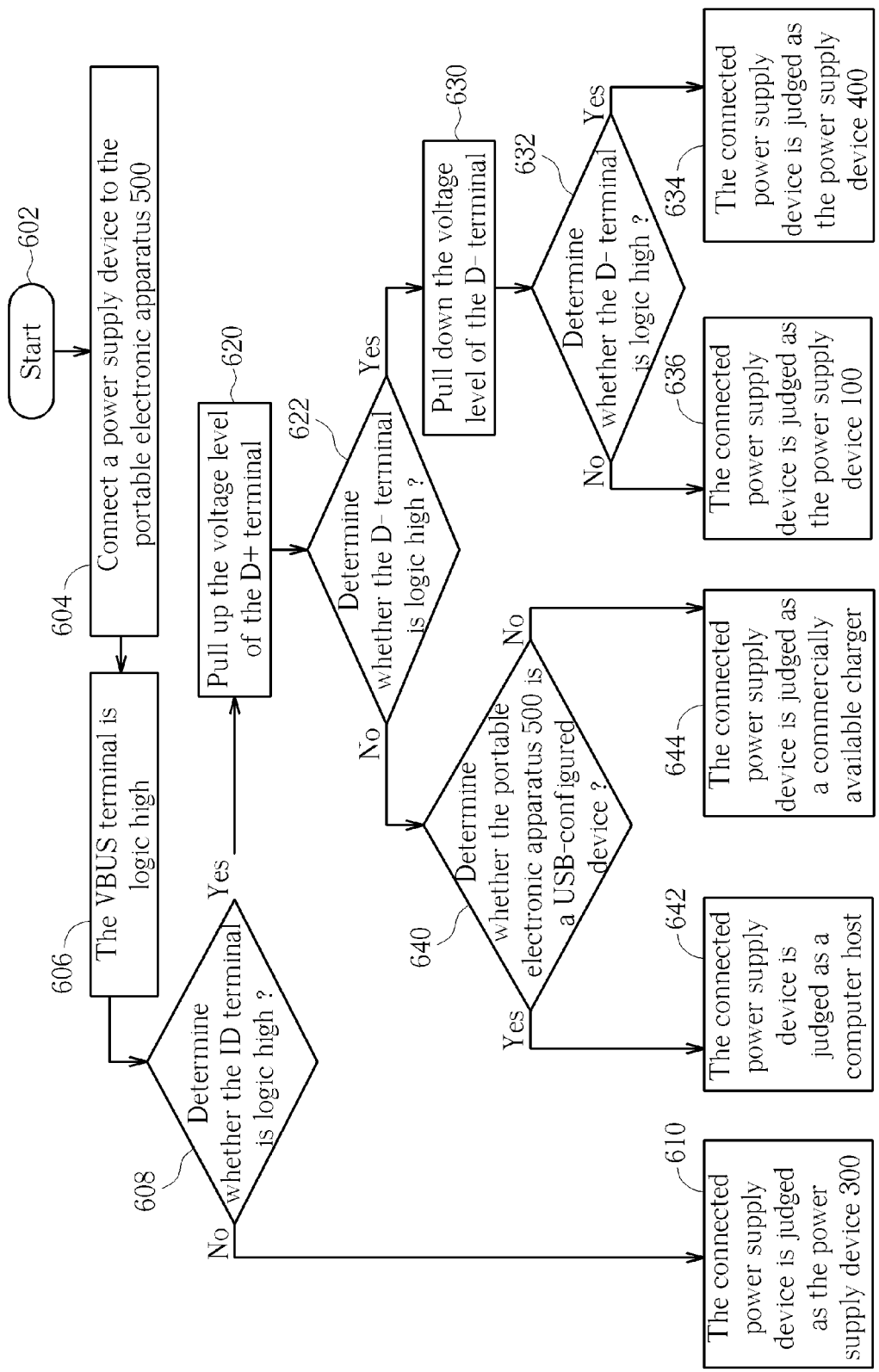
FIG. 6 is a flowchart illustrating a method for determining the type of a power supply device according to an exemplary embodiment of the present invention.

Please refer to FIG. 6. FIG. 6 is a flowchart illustrating a method for determining the type of a power supply device according to an exemplary embodiment of the present invention. Please note that the following steps are not limited to be performed according to the exact sequence shown in FIG. 6 if a roughly identical result can be obtained. The method includes, but is not limited to, the following steps:

Step 602: Start.

Step 604: Connect a power supply device to the portable electronic apparatus 500.

Step 606: The voltage level of the first terminal 511 is logic high.

Step 608: Determine the voltage level of the fourth terminal 514 so as to generate the first determining result DR1. When the first determining result DR1 indicates that the voltage level of the fourth terminal 514 is logic low, go to the step 610; otherwise, go to the step 620.

Step 610: When the first determining result DR1 indicates that the voltage level of the fourth terminal 514 is logic low, the connected power supply device is judged as the power supply device 300.

Step 620: When the first determining result DR1 indicates that the voltage level of the fourth terminal 514 is logic high, pull up the voltage level of the second terminal 512.

Step 622: When the voltage level of the second terminal 512 is pulled up, determine the voltage level of the third terminal 513 so as to generate the second determining result DR2. When the second determining result DR2 indicates that the voltage level of the third terminal 513 is logic high, go to the step 630; otherwise, go to the step 640.

Step 630: When the second determining result DR2 indicates that the voltage level of the third terminal 513 is logic high, pull down the voltage level of the third terminal 513.

Step 632: When the voltage level of the third terminal 513 is pulled down, determine the voltage level of the third terminal 513 so as to generate the third determining result DR3. When the third determining result DR3 indicates that the voltage level of the third terminal 513 is logic high, go to the step 634; otherwise, go to the step 636.

Step 634: The connected power supply device is judged as the power supply device 400 (namely, a charger conforming to China Charger's specifications).

Step 636: The connected power supply device is judged as the power supply device 100.

Step 640: Determine whether the portable electronic apparatus 500 is a USB-configured device so as to generate the fourth determining result DR4. When the fourth determining result DR4 indicates that the portable electronic apparatus 500 is a USB-configured device, go to the step 642; otherwise, go to the step 644.

Step 642: The connected power supply device is judged as a computer host.

Step 644: The connected power supply device is judged as a charger other than a computer host (namely, a commercially available charger).

The following description details how to determine the type of the connected power supply device by collocating the steps shown in FIG. 6, the elements shown in FIG. 5, and the power supply devices 100~400 shown in FIG. 1~FIG. 4. First, a power supply device is connected to the portable electronic apparatus 500 (the step 604). At this time, the voltage level of the first terminal 511 (namely, the VBUS terminal) is logic high (the step 606). In the step 608, the third determining unit 533 then determines the voltage level of the fourth terminal 514 (namely, the ID terminal). When the voltage level of the fourth terminal 514 is logic low, the judgment circuit 530 judges that the connected power supply device is the power supply device 300 as shown in FIG. 3 (the step 610); otherwise, when the voltage level of the fourth terminal 514 is logic high, the second determining unit 532 performs the detection of the second determining result DR2 (the steps 620~622).

Afterwards, the voltage level of the second terminal 512 is first pulled up via the resistor element R1 (the step 620), and the second determining unit 532 then determines the voltage level of the third terminal 513 (namely, the D+ terminal) so as to generate the second determining result DR2 (the step 622). When the voltage level of the third terminal 513 is logic high, the voltage level of the third terminal 513 is pulled down via the resistor element R2 (the step 630) and then makes use of the first determining unit 531 to determine the voltage level of the third terminal 513 (the step 632). When the voltage level of the third terminal 513 is logic high, the judgment circuit 530 judges that the connected power supply device is the power supply device 400 as shown in FIG. 4; otherwise, when the voltage level of the third terminal 513 is logic low, the judgment circuit 530 judges that the connected power supply device is the power supply device 100 as shown in FIG. 1.

On the other hand, when the determining result DR2 in the step 622 indicates that the voltage level of the third terminal 513 is logic low, the fourth determining unit 534 is further used for determining whether the portable electronic apparatus 500 is a USB-configured device (the step 640). If the portable electronic apparatus 500 is a USB-configured device, the judgment circuit 530 judges that the connected power supply device is a computer host (the step 642); otherwise, if the portable electronic apparatus 500 is not a USB-configured device, the judgment circuit 530 judges that the connected power supply device is a charger other than a computer host (namely, a commercially available charger) (the step 644).

In short, the type of the power supply device (for example, the power supply devices 100~400 shown in FIG. 1~FIG. 4) that is connected to the portable electronic apparatus 500 can be distinguished by means of the portable electronic apparatus 500 disclosed in FIG. 5 allocating with the judgment mechanism disclosed in FIG. 6.

Please note that, the steps of the abovementioned flowchart are presented merely for describing the present invention, and in no way should be considered to be limitations of the scope of the present invention. Those skilled in the art should observe that the method shown in FIG. 6 can include other intermediate steps or several steps can be merged into a single step without departing from the spirit of the present invention.

The abovementioned embodiments are presented merely for describing the features of the present invention, and in no way should be considered to be limitations of the scope of the present invention. In summary, the present invention provides a power supply device, a portable electronic apparatus and a related method for determining the type of a power supply device. The power supply device 100 disclosed in the present invention adds a resistor element R between the second pin 132 (namely, the D+ pin) and the third pin 133 (namely, the D− pin) of the USB connector 130, such that the power supply device 100 and the transmission line 140 can be designed as two separate accessories. For this reason, the transmission line 140 can further be used for transmitting data. Thus, not only can the cost be saved, but also its applications can be expanded. Furthermore, by adding the judgment circuit 530 (including the first determining unit 531, the second determining unit 532, the third determining unit 533, and the fourth determining unit 534) into the portable electronic apparatus 500 and by allocating with the judgment mechanism (for example, if the designated connector 510 of the portable electronic apparatus 500 is connected to a power supply device with different types, each of the terminals has different voltage levels) disclosed in the present invention, the type of the power supply device (for example, the power supply devices 100~400 shown in FIG. 1~FIG. 4) that is connected to the portable electronic apparatus 500 can be distinguished. In addition, those skilled in the art should appreciate that various extended applications may be made to the power supply devices of different types depending on design demands, and its applications are not limited in the present invention. What's more, the judgment mechanism disclosed in the present invention can be further used for performing quality control of the power supply devices, such that the portable electronic apparatus can avoid damages from defective chargers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply device, comprising:
a power input terminal, for receiving an input power;
a power converting circuit, coupled to the power input terminal, for converting the input power into a charge power; and
a universal serial bus (USB) connector, comprising:
a first pin, for providing the charge power;
a second pin, for delivering data;
a third pin, for delivering data;
a fourth pin, used as an identification judgment;
a fifth pin, coupled to a grounding terminal; and
a resistor element, coupled between the second pin and the third pin, wherein the resistor element has a resistance greater than or equal to 150KΩ.

* * * * *